(12) United States Patent
Zeng et al.

(10) Patent No.: US 12,231,204 B2
(45) Date of Patent: Feb. 18, 2025

(54) CROSS-CELL BEAM FAILURE RECOVERY

(71) Applicant: Apple Inc., Cupertino, CA (US)

(72) Inventors: Wei Zeng, San Diego, CA (US); Dawei Zhang, Saratoga, CA (US); Haitong Sun, Irvine, CA (US); Hong He, Cupertino, CA (US); Oghenekome Oteri, San Diego, CA (US); Weidong Yang, San Diego, CA (US); Sigen Ye, Whitehouse Station, NJ (US); Chunxuan Ye, San Diego, CA (US); Chunhai Yao, Beijing (CN); Jie Cui, San Jose, CA (US); Yang Tang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 17/442,108

(22) PCT Filed: Aug. 4, 2020

(86) PCT No.: PCT/CN2020/106911
§ 371 (c)(1),
(2) Date: Sep. 22, 2021

(87) PCT Pub. No.: WO2022/027254
PCT Pub. Date: Feb. 10, 2022

(65) Prior Publication Data
US 2022/0302986 A1 Sep. 22, 2022

(51) Int. Cl.
*H04B 7/06* (2006.01)
*H04W 24/08* (2009.01)
(Continued)

(52) U.S. Cl.
CPC .......... *H04B 7/0695* (2013.01); *H04W 24/08* (2013.01); *H04W 56/001* (2013.01);
(Continued)

(58) Field of Classification Search
CPC .. H04B 7/0692; H04B 7/0694; H04B 7/0695; H04W 76/00; H04W 76/10; H04W 76/19;
(Continued)

(56) References Cited

U.S. PATENT DOCUMENTS 11,206,596 B2 * 12/2021 Chen ..................... H04W 36/36
11,483,054 B2 * 10/2022 Yu ........................ H04B 7/0695
(Continued)

FOREIGN PATENT DOCUMENTS

| CN | 108811092 A | 11/2018 |
|---|---|---|
| CN | 109314875 A | 2/2019 |
| CN | 109391409 A | 2/2019 |

OTHER PUBLICATIONS

International Search Report for PCT Patent Application No. PCT/CN2020/106911; mailed May 6, 2021.
(Continued)

*Primary Examiner* — Warner Wong
(74) *Attorney, Agent, or Firm* — Kowert, Hood, Munyon, Rankin & Goetzel, P.C.

(57) ABSTRACT

This disclosure relates to performing beam failure recovery during an inter-cell connection involving a UE in communication with one or more base stations in a cellular communication system. In various embodiments, a user equipment determines one or more beam failures by monitoring one or more reference signals transmitted by one or more base stations, where the UE is connected to the one or more base stations. The UE further performs candidate beam detection by monitoring at least one candidate reference signal that is transmitted by one or more candidate base
(Continued)

stations, where at least one candidate base station (a first candidate base station) is different from the one or more base stations to which the UE was previously communicating. The UE selects the first candidate base station based on the candidate beam detection, and transmits a beam failure recovery request (BFRQ) message to the first candidate base station based on the selection.

16 Claims, 6 Drawing Sheets

(51) Int. Cl.
*H04W 56/00* (2009.01)
*H04W 74/0833* (2024.01)
*H04W 76/19* (2018.01)
*H04W 36/08* (2009.01)

(52) U.S. Cl.
CPC ....... *H04W 74/0841* (2013.01); *H04W 76/19* (2018.02); *H04W 36/085* (2023.05)

(58) Field of Classification Search
CPC ..... H04W 24/00; H04W 24/08; H04W 74/00; H04W 74/08; H04W 74/0841; H04W 76/18; H04W 3/085; H04W 72/046; H04W 36/085; H04W 36/02
See application file for complete search history.

(56) References Cited

U.S. PATENT DOCUMENTS

| | | | |
|---|---|---|---|
| 2016/0066242 A1 | 3/2016 | Su | |
| 2018/0227899 A1* | 8/2018 | Yu | H04B 7/088 |
| 2018/0279218 A1* | 9/2018 | Park | H04W 48/20 |
| 2018/0367374 A1 | 12/2018 | Liu | |
| 2019/0037423 A1* | 1/2019 | Yu | H04B 7/0695 |
| 2019/0037604 A1* | 1/2019 | Akkarakaran | H04L 5/001 |
| 2019/0124640 A1 | 4/2019 | Nagaraja et al. | |
| 2019/0253949 A1* | 8/2019 | Park | H04W 36/0077 |
| 2019/0280756 A1* | 9/2019 | Fan | H04W 74/0833 |
| 2020/0068416 A1* | 2/2020 | Kang | H04W 72/21 |
| 2020/0137801 A1* | 4/2020 | Chen | H04W 74/0833 |
| 2020/0228185 A1* | 7/2020 | Tao | H04W 72/23 |
| 2020/0229257 A1* | 7/2020 | Venugopal | H04W 72/1268 |
| 2020/0275524 A1* | 8/2020 | Wang | H04B 7/0695 |
| 2020/0280483 A1* | 9/2020 | Zhang | H04W 72/04 |
| 2020/0344621 A1* | 10/2020 | Xu | H04W 72/21 |
| 2020/0373991 A1* | 11/2020 | Zhou | H04W 72/0466 |
| 2021/0006456 A1* | 1/2021 | Kim | H04W 72/20 |
| 2021/0028853 A1* | 1/2021 | Wu | H04W 56/001 |
| 2021/0050968 A1* | 2/2021 | Yi | H04L 5/0048 |
| 2021/0058130 A1* | 2/2021 | Zhu | H04W 72/23 |
| 2021/0058999 A1* | 2/2021 | Chen | H04W 72/23 |
| 2021/0067234 A1* | 3/2021 | Guan | H04W 72/046 |
| 2021/0083751 A1* | 3/2021 | Chen | H04L 25/0226 |
| 2021/0126693 A1* | 4/2021 | Bai | H04W 76/19 |
| 2021/0135713 A1* | 5/2021 | Kang | H04W 72/046 |
| 2021/0289372 A1* | 9/2021 | Liu | H04W 72/21 |
| 2021/0306868 A1* | 9/2021 | Johansson | H04W 72/046 |
| 2021/0307100 A1* | 9/2021 | Talebi Fard | H04W 76/18 |
| 2021/0351834 A1* | 11/2021 | Yang | H04W 16/28 |
| 2021/0360701 A1* | 11/2021 | Xu | H04L 5/0053 |
| 2022/0039077 A1* | 2/2022 | Koskela | H04W 72/23 |
| 2022/0116094 A1* | 4/2022 | Wang | H04L 5/001 |
| 2022/0131591 A1* | 4/2022 | Huang | H04W 76/19 |
| 2022/0140882 A1* | 5/2022 | Matsumura | H04L 5/001 370/329 |
| 2022/0201792 A1* | 6/2022 | Zhou | H04B 7/08 |
| 2022/0217734 A1* | 7/2022 | Chen | H04B 7/0695 |
| 2022/0377756 A1* | 11/2022 | Sun | H04B 7/088 |
| 2023/0058492 A1* | 2/2023 | Wang | H04L 5/001 |

OTHER PUBLICATIONS

Intel Corporation "On SCell Beam Failure Recovery"; 3GPP TSG RAN WG1 Meeting #94 R1-1808720; Aug. 11, 2018.
Office Action for CN Patent Application No. 202080103280.2, Sep. 9, 2024.

\* cited by examiner

CROSS-CELL BEAM FAILURE RECOVERY

PRIORITY CLAIM INFORMATION

This application is a U.S. National Stage application of International Application No. PCT/CN2020/106911, filed Aug. 4, 2020, titled "Cross-Cell Beam Failure Recovery", which is hereby incorporated by reference in its entirety.

FIELD

The present application relates to wireless communications, and more particularly to systems, apparatuses, and methods for performing a beam failure recovery procedure during an inter-cell connection in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the robustness and accuracy of transmitted and received signals through user equipment (UE) devices, e.g., through wireless devices such as cellular phones, base stations and relay stations used in wireless cellular communications.

For example, one particular issue that can arise in cellular communication systems is referred to as beam failure. Beam failure may occur when the reference signal receive power (RSRP) of a beam with which a UE is currently communicating falls below a threshold. When this occurs, the UE may need to acquire a new beam to maintain communication with the cellular network. The ability of a UE to recover from a beam failure is very important for the user experience. Accordingly, improvements in the field are desired.

SUMMARY

Embodiments are presented herein of apparatuses, systems, and methods for performing beam failure recovery in a cellular communication system using non-currently used base stations and cells for beam failure recovery, referred to herein as cross-cell beam failure recovery. According to the techniques described herein, control signaling messages may be used to support beam failure recovery during an inter-cell connection involving the UE in communication with a plurality of base stations.

In various embodiments, a user equipment may determine one or more beam failures by monitoring one or more reference signals transmitted by one or more base stations, where the UE is connected to these one or more base stations. In response to detection of beam failure(s), the UE further may perform candidate beam detection by monitoring one or more candidate reference signals that are transmitted by one or more candidate base stations, where at least one candidate base station (a first candidate base station) is different from the one or more base stations to which the UE was previously communicating. The UE may select the first candidate base station based on the candidate beam detection, and then may transmit a beam failure recovery request (BFRQ) message to the first candidate base station based on the selection.

In some other embodiments, prior to a beam failure event a physical serving base station (a base station that is currently serving the UE) may obtain a physical cell identifier of each of one or more other base stations (base stations not being currently used by the UE), and may provide these physical cell identifiers to the UE. These physical cell identifiers may form a candidate list that is useable by the user equipment (UE) for beam failure recovery. More specifically, the candidate list comprising the one or more physical cell identifiers may be usable by the UE to monitor a candidate reference signal from each of the corresponding one or more base stations during beam failure recovery. The physical serving base station may also transmit to the UE control signaling to configure PRACH resources for one or more base stations belonging to the candidate list, with the PRACH resources being useable by the UE to send a beam failure recovery request (BFRQ) message to at least one of the base stations in the candidate list during beam failure recovery.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
CFRA: Contention Free Random Access
CBRA: Contention Based Random Access
BFRQ: Beam Failure Recovery Request
BFRR: Beam Failure Recovery Response
BFD RS: Beam Failure Detection Reference Signal
CBD RS: Candidate Beam Detection Reference Signal
PRACH: Physical Random-Access Channel
SSB: Synchronization Signal Block
CSI-RS: Channel State Information Reference Signal
RSRP: Reference Signal Receive Power
SINR: Signal-to-interference Plus Noise
BLER: Block Error Rate Terms The Following is a Glossary of Terms that May Appear in the Present Disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs+ are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
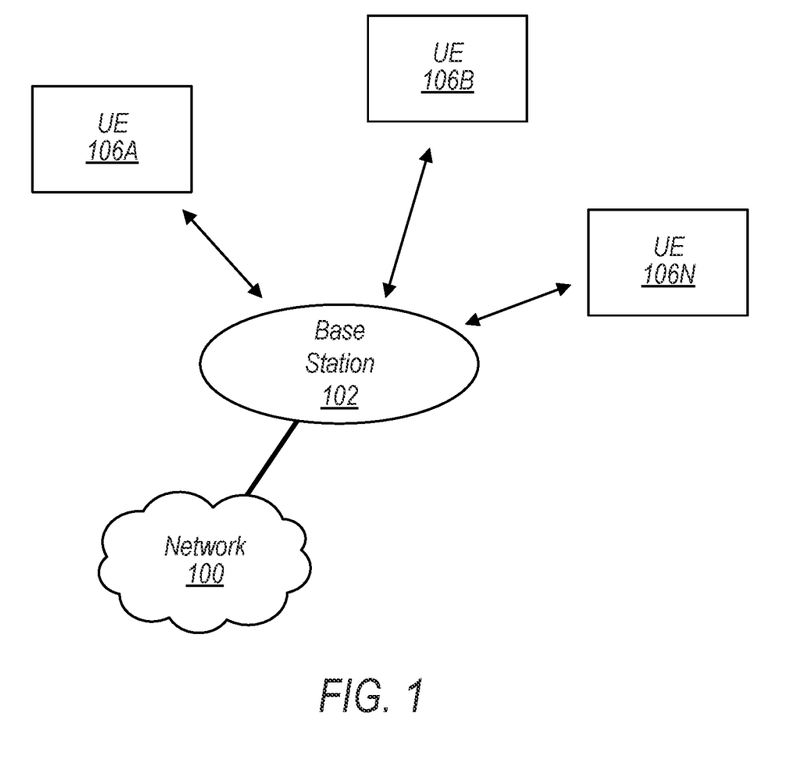
FIG. 1 illustrates an exemplary (and simplified) wireless communication system, according to some embodiments.
Figure 2:
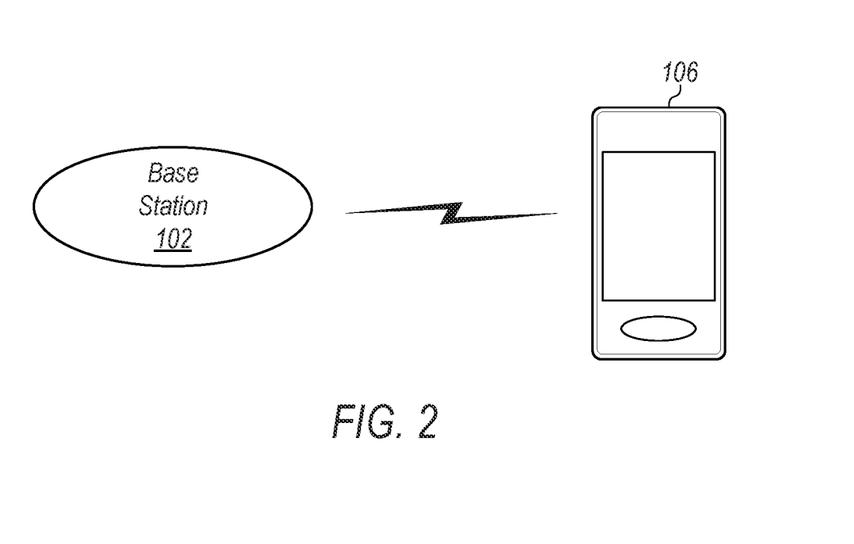
FIG. 2 illustrates an exemplary base station in communication with an exemplary wireless user equipment (UE) device, according to some embodiments.

FIGS. 1 and 2— Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 may also be configured to be camped on and communicate with multiple base stations concurrently. In some embodiments, the UE 106 may be configured to perform cross-cell beam failure recovery using a contention based random access procedure, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
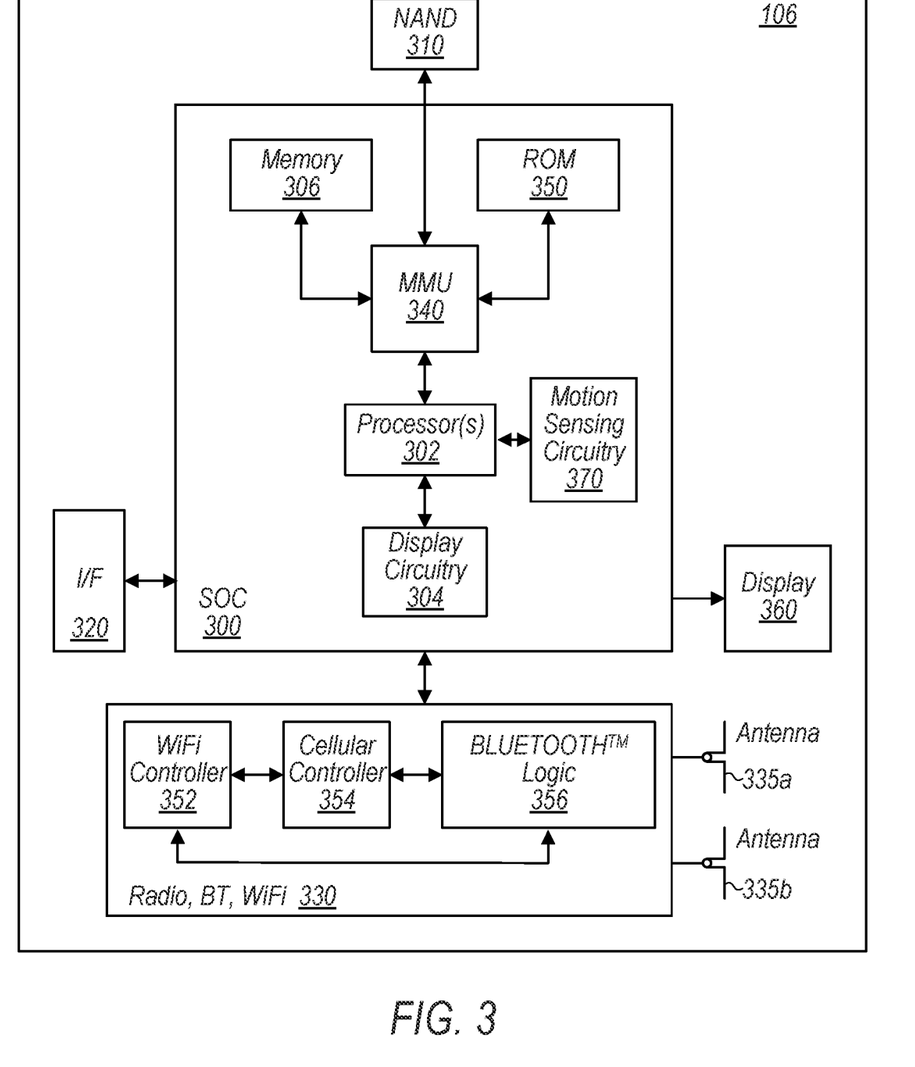
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery using a contention based random access procedure such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments may have fewer or more similar controllers for various different RATs that may be implemented in UE device 106.

Figure 4:
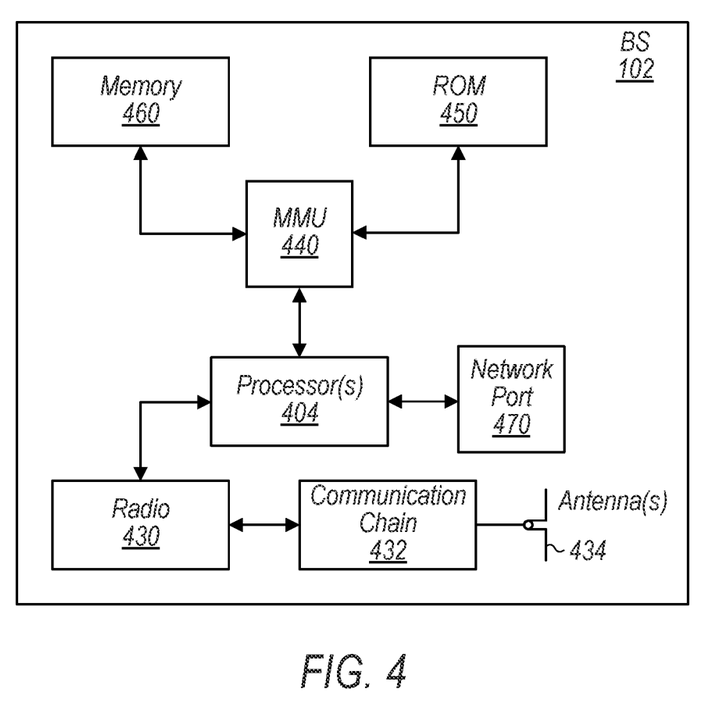
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may also be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for providing control signaling for use in performing beam failure recovery in a cellular communication system.

Figure 5:
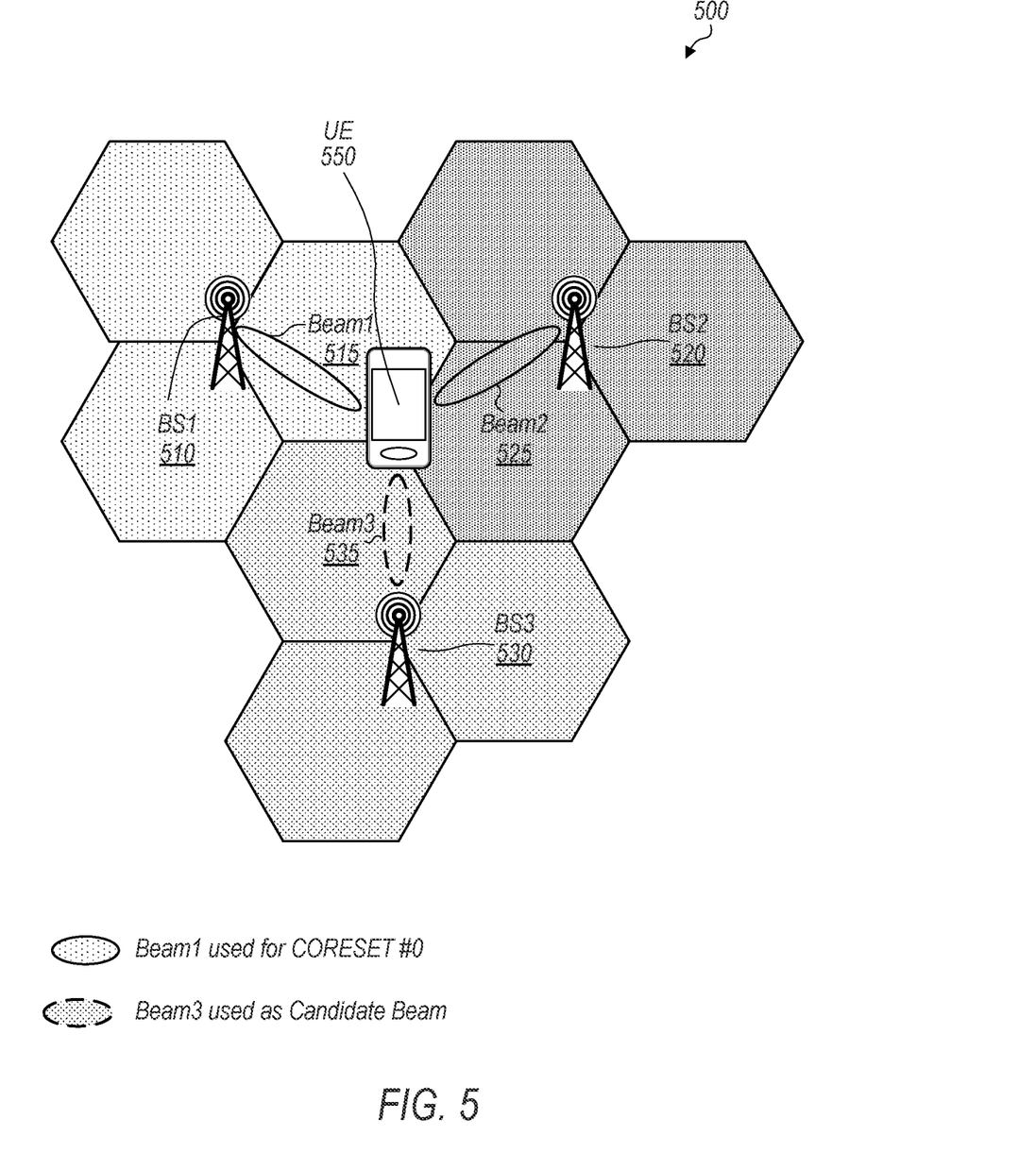
FIG. 5 illustrates a UE performing beam failure recovery involving multiple base stations during an inter-cell connection, according to some embodiments.

FIG. 5—Network Diagram of an Exemplary Inter-Cell Connection

FIG. 5 is a high-level network diagram illustrating interactions between wireless devices (e.g., cellular base stations and a wireless user equipment (UE) device, as shown, as one possibility) to communicate with each other during an inter-cell connection in a cellular communication system, according to some embodiments. Specifically, FIG. 5 deals with an inter-cell connection where a UE is capable of performing beam failure recovery with a candidate base station other than the one or more base stations to which the UE is currently connected.

FIG. 5 depicts a UE 550 in communication with BS1 510 and BS2 520 as part of an inter-cell connection involving more than one base station. Beam1 515 is used for communication between BS1 510 and UE 550, and Beam2 525 is used for communication between BS2 520 and UE 550. In the illustrated example, BS1 510 is the physical serving base station, meaning that BS1 510 is the base station that coordinates with the other base stations to maintain the inter-cell connection.

The physical serving base station BS1 510 may provide configuration information for beam failure detection to UE 550, as described further below with respect to FIG. 8. More specifically, the physical serving base station BS1 510 may provide to UE 550 a candidate list of physical cell identifiers of possible or candidate base stations which can be used for beam failure detection/selection in case of a beam failure event. In other words, the physical serving cell BS1 510 may configure the UE 550 with a candidate list of base stations on which to perform candidate beam detection in case both Beam1 515 and Beam2 525, to which the UE 550 is currently communicating, encounter beam failures. For example, the list of base candidate stations that BS1 provides to the UE 550 for beam failure detection may be a set comprising {BS1, BS2} because these are the two base stations to which the UE 550 is currently connected.

In some embodiments, the list of candidate base stations that BS1 provides to the UE 550 for beam failure detection is a set comprising {BS1, BS2, and BS3}, and thus a base station to which the UE is not currently in communication, BS3, is provided as a candidate base station. In other words, in the illustrated example of FIG. 5, the candidate list of base stations comprises {BS1, BS2, BS3}, where in the event of a beam failure the UE 500 performs detection of beams other than Beam1 515 on BS1 510 and Beam2 525 on BS2 520. It may be noted that each base station including BS1 510 and BS2 520 may be configured with multiple beams. The Beam3 535 is shown in dotted lines in FIG. 5 because UE 550 is not yet connected to this beam.

The UE detects the failure of both Beam1 515 and Beam2 525 separately, by measuring a signal strength of a reference signal corresponding to BS1 510 and BS2 520, and comparing the signal strength to a failure threshold. The signal strength may be measured as a reference signal receive power (RSRP) or signal-to-interference plus noise (SINR) or hypothetical block error rate (BLER) of the reference signal. If the signal strength for any of Beam1 515 or Beam2 525 is measured to be lower than the failure threshold for a certain number of times (one or more times), then the UE 550 may determine that the corresponding beam for which the signal strength is lower than the failure threshold has encountered a beam failure.

In some embodiments, upon detecting beam failures for each of the beams to which the UE 550 is currently connected, the UE 550 begins candidate beam detection by monitoring the signal strength of a beam belonging to one or more base stations in the candidate list. For example, the UE 550 may begin candidate beam detection on Beam3 535 of BS3 530 as soon as UE 550 determines that both Beam1 515 and Beam2 525 have encountered beam failures. The UE 550 may perform a candidate beam selection of Beam3 (i.e., may select candidate beam Beam3) when a signal strength of a reference signal being transmitted by Beam3 exceeds a success threshold. The reference signal for beam failure detection may be a Synchronization Signal Block (SSB) and/or Channel State Information Reference Signal (CSI-RS) being transmitted by the candidate base station.

FIG. 5 also illustrates that Beam1 515 is the beam on which the UE 550 receives broadcast information with beam sweeping operation on control resource set index 0 (CORESET #0). If the UE 550 detects that Beam1 has encountered a beam failure, then the UE 550 may switch to receiving CORESET #0 from another beam, for example Beam3 535, upon completion of successful beam failure recovery with BS3 530. As mentioned previously, Beam3 535 is a beam that UE 550 is configured to use as a candidate beam during inter-cell (interchangeably referred to as cross-cell in the present document) beam failure recovery.

Aspects of the network of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the network of wireless devices depicted in FIG. 5 may be used in any suitable wireless communication system, as desired.

Figure 6:
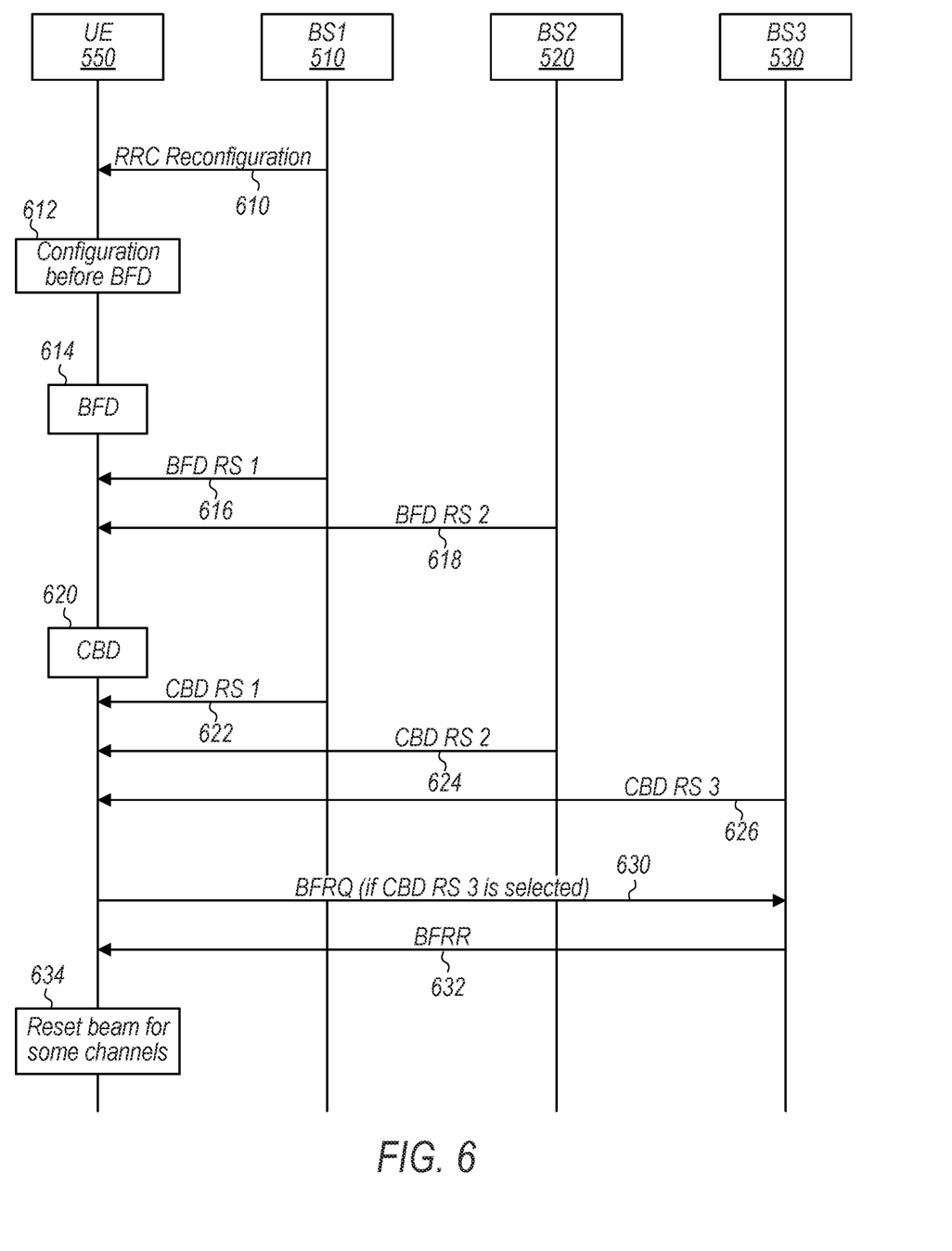
FIG. 6 is a communication flow diagram illustrating operation of a UE performing beam failure recovery by selecting a candidate beam from a different base station than the base station with which the UE is currently connected in a cellular communication system, according to some embodiments.

FIG. 6

FIG. 6 is a communication flow diagram illustrating aspects of an example method for performing beam failure recovery. In particular, FIG. 6 illustrates a signal flow where the UE selects a candidate beam from a different base station than the base station(s) to which the UE is currently connected, in a cellular communication system, according to some embodiments. FIG. 6 illustrates an example signal flow of the operations described with respect to FIG. 5.

At step 610, a physical serving base station BS1 510 sends an RRC Reconfiguration message to UE 550. The RRC Reconfiguration message may be sent by the physical serving base station BS1 510 every time there is new or updated configuration information, either about base stations that the UE 550 is connected to, or a candidate base station that the UE 550 may connect to in case of beam failure recovery. The RRC Reconfiguration signaling message is enhanced to include a physical cell identifier (PhysCellId) of each base station for which configuration information is provided to the UE whether for beam failure detection (BFD) on one or more base stations that the UE is already connected to, or for candidate beam detection (CBD) on one or more base stations that belong to a candidate list that is also configured through the RRC Reconfiguration message.

At step 612 configuration information received from the physical serving base station (for example, BS1 510) is stored by the user equipment (for example, UE 550). Steps 610 and 612 may occur before beam failure detection (BFD) is performed. In some embodiments, signaling messages other than RRC Reconfiguration message may be used to provide configuration information in steps 610 and 612. For example, configuration information about base stations on which to perform BFD or CBD may be provided to UE 550 through other types of signaling. The sending of RRC Reconfiguration may be repeated as necessary to inform UE 550 of any configuration changes for any base station of interest to UE 550. For example, if the UE moves to a new geographic area and is now proximate to one or more different base stations, the physical serving base station may send the UE an RRC Reconfiguration message with information regarding the new candidate base stations.

At step 614, an example BFD procedure performed by UE 550 is illustrated. In particular, at step 616 and 618, the UE 550 monitors a reference signal, referred to as a beam failure detection reference signal (shown as BFD RS in FIG. 6), transmitted by the physical serving base station BS1 510 and another base station BS2 520. For example, the reference signal for beam failure detection may be a Synchronization Signal Block (SSB) and/or Channel State Information Reference Signal (CSI-RS) transmitted by the one or more base stations BS1 510 and BS2 520 that UE 550 is configured to monitor for beam failure detection. More than one BFD RS signal may be transmitted by either BS1 510 or BS2 520 or both. UE 550 may determine that a beam has encountered beam failure when the measured signal strength of the BFD RS from the beam is lower than a failure threshold, for one or more measurements. The failure threshold may be configured for the beams belonging to each base station to which the UE 550 is connected. In some embodiments, the failure threshold is the same for all the base stations that the UE 550 is configured to monitor for BFD (for example, the failure threshold is the same for beams associated with both BS1 510 and BS2 520.) In other embodiments, the failure threshold is configured differently for different base stations. For example, the failure threshold for BS1 510 may be configured differently from the failure threshold of BS2 520 to take into account different characteristics of BS1 510 and BS2 520 (for example, BS1 510 may be a pico cell while BS2 520 may be a macro cell, with differences in transmit power between the two BSs, among other possible differences.)

At step 620, an example CBD procedure performed by UE 550 is illustrated. In particular, at step 622, 624, and 626, the UE 550 monitors a candidate beam detection reference signal (shown as CBD RS in FIG. 6) from the physical serving base station BS1 510, BS2 520, and BS3 530, respectively. In the present example, BS3 530 is a neighbor base station to which UE 550 was not previously connected. For example, similar to as noted above for beam failure detection, the reference signal for candidate beam detection may be a Synchronization Signal Block (SSB) and/or Channel State Information Reference Signal (CSI-RS) being transmitted by the one or more base stations BS1 510 and BS2 520 that the UE 550 is currently connected to, and from BS3 530 that is a candidate base station. The UE 550 may monitor the candidate beam detection reference signal (CBD RS) from a subset or all of the base stations configured as belonging to the candidate list. More than one CBD RS signal may be transmitted by any of the one or more base stations in the candidate list, i.e., BS1 510, BS2 520, or BS3 530 in the present example.

UE 550 may determine that a candidate beam on any of the one or more base stations passes a candidate beam selection criterion when the signal strength of the CBD RS from the candidate beam exceeds a success threshold. The success threshold may be configured for the beams belonging to each base station in the candidate list. For example, the signal strength may be measured as a reference signal receive power (RSRP) of the CBD RS. The signal strength used in measuring the CBD RS may be similar to the options described above in measuring the BFD RS. In some embodiments, the success threshold is the same for all the base stations that the UE 550 is monitoring for candidate beams (for example, the threshold is the same for beams associated with BS1 510, BS2 520, and BS3 530.) In other embodiments, the success threshold is configured differently for some of the one or more base stations in the candidate list. For example, the success threshold for BS1 510 may be configured differently from the failure threshold of BS2 520 to take into account different characteristics of BS1 510 and BS2 520, as previously described. The success threshold of BS3 530 may be the same as either BS1 510 or BS2 520, or it may be different from either one. Thus, the UE 550 determines that the CBD RS from BS3 530 has passed the candidate beam selection criterion on a particular SSB or CSI-RS that was monitored by the UE.

At step 630, in response to selection of a candidate beam from base station BS3 530, the UE transmits a beam failure recovery request (BFRQ) message to BS3 530. The UE uses an association between the SSB or CSI-RS and a set of PRACH resources that had been provided to UE 550 as part of configuration information to determine the set of PRACH resources on which UE 550 sends the BFRQ message to BS3 530.

At step 632, UE 550 receives a beam failure recovery response (BFRR) message from BS3 530. The BFRR messages serves an acknowledgement for the BFRQ message sent by UE 550 in the previous step.

At step 634, UE 550 switches to using the selected candidate beam for receiving physical downlink control channel (PDCCH) and sending physical uplink control channel (PUCCH) signaling messages from/to the neighbor base station, BS3 530. UE 550 may also switch to using the selected candidate beam to receive PDSCH/CSI-RS and to transmit SRS/PUSCH from/to BS3 530. UE 550 performs switching to the candidate beam after waiting for a number of symbols from the time of receiving the BFRR message in the previous step, which may be the same time at which BS3 530 also switches to using the selected candidate beam for communication with UE 550. The number of symbols may not be fixed, but rather may be variable dependent upon whether fine timing synchronization is required by the UE for establishing communication with the first base station. More details about the switching to use the selected candidate beam is provided in conjunction with the description of FIG. 7 below. After switching to use the selected candidate beam for communication with one or more base station as described above, the UE may use uplink power control parameters based on the parameters configured for the base station for the selected candidate beam, with the pathloss reference signal being based on the CBD RS reported by BFRQ.

By enabling the UE to select beams for communication with base stations that may be different from the base stations to which the UE is currently connected, the present disclosure confers the advantage of greater flexibility to the UE during inter-cell beam failure events for more robust communication. In other words, the present disclosure describes embodiments where during beam failure recovery the UE can select a "new" base station to which the UE was not previously connected. This provides the UE a greater selection of possible base stations (and beams) for beam failure recovery, and hence may provide improved connectivity between the UE and the cellular network.

Figure 7:
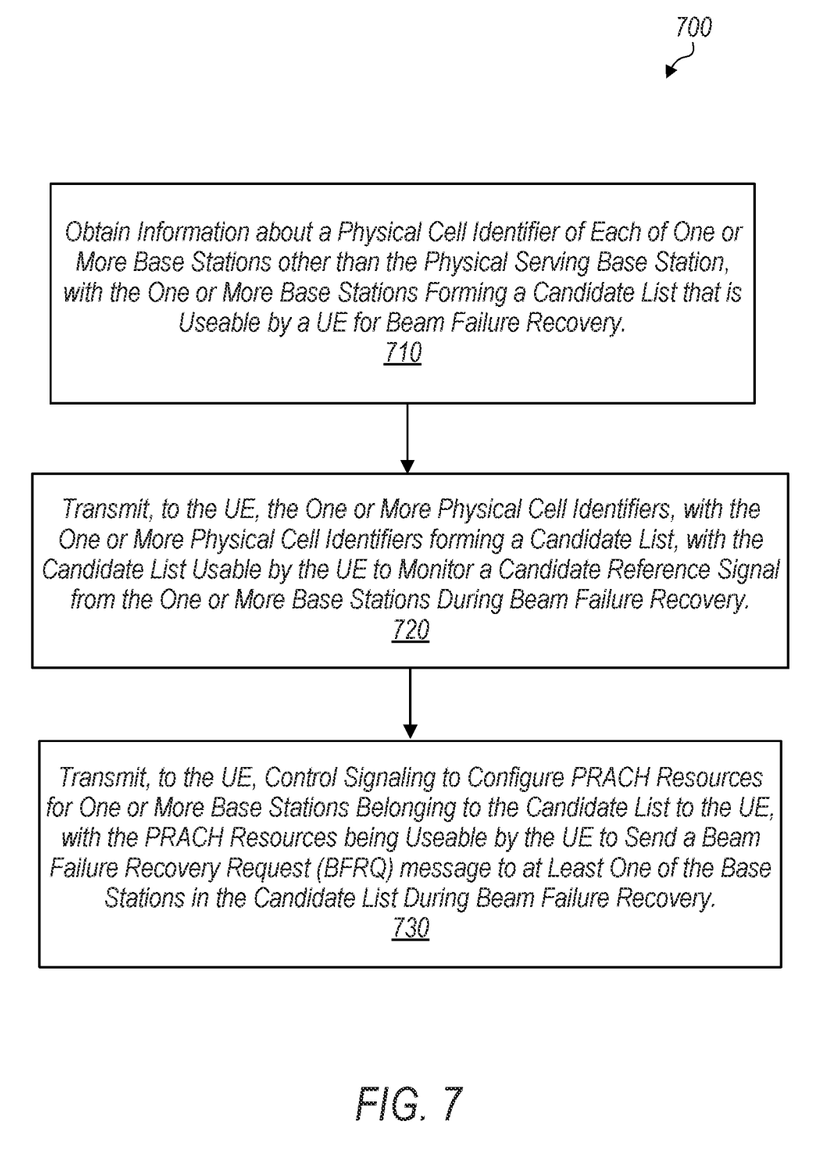
FIG. 7 is a flowchart illustrating operation of a physical serving base station in providing control signaling to the UE and other base stations to support subsequent beam failure recovery operations during an inter-cell connection in a cellular communication system, according to some embodiments.

FIG. 7

FIG. 7 is a flowchart diagram illustrating a method performed by a physical serving base station providing configuration information to a UE and/or one or more candidate base stations for beam failure recovery during an inter-cell connection.

At step 710, the physical serving base station may obtain a physical cell identifier of each of one or more base stations (other than itself). These one or more base stations may form a candidate list that is useable by a UE for beam failure recovery. Current control signaling for beam failure recovery does not enable a UE to search for a candidate beam from another base station to which the UE is not currently connected. To address this problem, in the described embodiments the physical serving base station may gather physical cell identifiers for each of a subset or all of the base stations to which the UE is connected, as well as neighboring base station(s) to which the US is not currently connected. These physical cell identifiers are obtained by the physical serving base station so that they then can be provided to the UE for use as a candidate list during beam failure recovery.

In some embodiments, the information about the physical cell identifiers is configured by a physical serving base station to the UE, as and when the UE connects to a base station other than the serving base station. For example, a Radio Resource Control (RRC) Reconfiguration message is sent by the serving base station to the UE when a base station other than the serving base station is added for communication with the UE. The message includes an information element (IE) called RadioLinkMonitoringConfig that is used to configure radio link monitoring for detection of beam failure (as defined in some wireless communication standards.) For example, the RadioLinkMonitoringConfig IE may be modified to include the PhysCellId field in one component of the IE, as follows:

```
RadioLinkMonitoringRS ::=         SEQUENCE {
    radioLinkMonitoringRS-Id          RadioLinkMonitoringRS-Id,
    purpose                            ENUMERATED {beamFailure, rlf, both},
    detectionResource                  CHOICE {
        ssb-Index                         SSB-Index,
        csi-RS-Index                      NZP-CSI-RS-ResourceId
    },
    physCellId PhysCellId OPTIONAL
    ...
}
```

At step 720, the physical serving base station transmits the one or more physical cell identifiers (obtained in step 710) to a UE. The one or more physical cell identifiers may form a candidate list usable by the UE to monitor a candidate reference signal from the one or more base stations during beam failure recovery. In some embodiments, the physical serving base station may transmit the physical cell identifiers as part of an RRC signaling message that is sent to the UE. For example, the physical serving base station may transmit the physical cell identifiers of one or more base stations belonging to the candidate list in a RRC Reconfiguration message.

At step 730, the physical serving base station transmits control signaling to the UE to configure PRACH resources for one or more base stations belonging to the candidate list. The PRACH resources may. be useable by the UE to send a beam failure recovery request (BFRQ) message to at least one of the base stations in the candidate list during beam failure recovery. For example, an association between a set of PRACH resources and a Synchronization Signal Block (SSB) of the one or more base stations belonging to the candidate list may be configured through control signaling. The association may be useable by the UE to choose the PRACH resources to transmit the BFRQ message based on the SSB corresponding to a selected beam of a base station belonging to the candidate list. It may be noted that the one or more SSBs transmitted by the one or more base stations may each correspond to a beam for communication between the UE and the corresponding base station. For example, as described above, the UE may measure the signal strength of a reference signal by measuring the RSRP of the one or more SSBs being transmitted by the one or more base stations belonging to the candidate list. When the UE identifies at least one SSB with a signal strength that exceeds a success threshold, then the UE transmits the BFRQ message by using the PRACH resources that are associated with the identified SSB in the configuration information.

For example, signaling messages for configuring control signaling messages for beam failure recovery, including the configuration for PRACH resources for sending BFRQ message are enhanced as part of the present disclosure as follows:

```
PRACH-ResourceDedicatedBFR-r17 ::= CHOICE {
    ssb BFR-SSB-Resource-r17,
    csi-RS BFR-CSIRS-Resource-r17
}
BFR-SSB-Resource-r17 ::= SEQUENCE {
    ssb SSB-Index,
    ra-PreambleIndex INTEGER (0..63),
    physCellId PhysCellId
    ...
}
BFR-CSIRS-Resource-r17 ::= SEQUENCE {
    csi-RS NZP-CSI-RS-ResourceId,
    ra-OccasionList SEQUENCE (SIZE(1..maxRA-OccasionsPerCSIRS)) OF INTEGER
(0..maxRA-Occasions-1) OPTIONAL, -- Need R
    ra-PreambleIndex INTEGER (0..63) OPTIONAL, -- Need R
    physCellId PhysCellId
    ...
}
BeamFailureRecoverySCellConfig-r17 ::= SEQUENCE {
    rsrp-ThresholdBFR-r17 SEQUENCE (SIZE(1..maxNrofActiveCell) OF RSRPRange
OPTIONAL, -- Need M
    candidateBeamRSSCellList-r17 SEQUENCE (SIZE(1..maxNrofCandidateBeams-r16))
OF CandidateBeamRS-r17 OPTIONAL, -- Need M
    ...
}
CandidateBeamRS-r17 ::= SEQUENCE {
    candidateBeamConfig-r17 CHOICE {
    ssb-r16 SSB-Index,
    csi-RS-r16 NZP-CSI-RS-ResourceId
    },
    servingCellId ServCellIndex   OPTIONAL -- Need R
    physCellId PhysCellId
}
```

In some embodiments, the physical serving base station may transmit control signaling to the one or more base stations to configure an association between a set of PRACH resources and a Synchronization Signal Block (SSB) of the one or more base stations belonging to the candidate list. When the one or more base stations receive the BFRQ message on a set of PRACH resources, the one or more base stations use the association between the PRACH resources and the SSB of the one or more base stations to identify the beam that the UE had selected. As described above, the one or more base stations may use the identified beam to switch communicating physical downlink control channel (PDCCH) and physical uplink control channel (PUCCH) signaling messages to the identified beam, after a number of symbols from a time when the BFRR is sent by the one or more base stations in response to receiving the BFRQ message. In some embodiments, the number of symbols is not fixed, but may be variable for each of the one or more base stations dependent upon whether fine timing synchronization is required by the UE for establishing communication with the one or more base stations.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   determining, by a user equipment (UE), one or more beam failures by monitoring one or more reference signals transmitted by one or more base stations (BS), wherein the UE is connected to the one or more base stations;
   performing, by the UE, candidate beam detection by monitoring at least one candidate reference signal that is transmitted by a first candidate base station, wherein the UE is not connected to the first candidate base station;
   selecting, by the UE, the first candidate base station based on the candidate beam detection, wherein the selecting the first candidate base station comprises determining whether a signal strength of the at least one candidate reference signal associated with the first candidate base station is above a success threshold, wherein the success threshold is different for each of a plurality of candidate base stations, and wherein the plurality of candidate base stations includes the first candidate base station; and
   transmitting, by the UE, a beam failure recovery request (BFRQ) message to the first candidate base station, based on the selection of the first candidate base station with respect to the candidate beam detection.

2. The method of claim 1, further comprising:
   receiving, by the UE from a first one of the one or more base stations, a physical cell ID of each of one or more candidate base stations, wherein the first candidate base station is one of the one or more candidate base stations; and
   performing, by the UE, the candidate beam detection on the one or more candidate base stations using the received physical cell ID of each of the one or more candidate base stations.

3. The method of claim 1, further comprising:
   receiving, by the UE from a first one of the one or more base stations, physical cell IDs of a plurality of candidate base stations, wherein the first candidate base station is one of the plurality of candidate base stations;
   storing the physical cell IDs in a memory of the UE; and
   in response to determining the one or more beam failures, accessing the physical cell IDs from the memory to identify one or more candidate base stations for performing candidate beam detection on the identified one or more candidate base stations.

4. The method of claim 1,
   wherein the transmitting the BFRQ message to the first candidate base station is performed through a physical random-access channel (PRACH).

5. The method of claim 4, further comprising:
   receiving, by the UE, a beam failure recovery response (BFRR) message from the first candidate base station,
   in response to receiving the BFRR message:
      switching, by the UE, to communicate physical downlink control channel (PDCCH) and physical uplink control channel (PUCCH) signaling messages from a selected candidate beam associated with the first candidate base station after a predetermined number of symbols.

6. The method of claim 5, further comprising:
   in response to receiving the BFRR message:
      switching, by the UE, to communicate physical data shared channel (PDSCH) and physical uplink shared channel (PUSCH) signaling messages from the selected candidate beam associated with the first candidate base station after a predetermined number of symbols.

7. The method of claim 1, wherein the candidate beam detection by the UE is performed in response to a beam failure event, wherein the beam failure event comprises determining that a signal strength of the monitored reference signals for each of the one or more base stations is lower than a failure threshold.

8. An apparatus, comprising:
   a processor configured to cause a user equipment (UE) to:
      determine one or more beam failures by monitoring one or more reference signals associated with one or more base stations to which the UE is connected;
      perform candidate beam detection by monitoring at least one candidate reference signal that is transmitted by a first candidate base station to which the UE is not connected;
      transmit a beam failure recovery request (BFRQ) message to the first candidate base station, wherein the transmission of the BFRQ is based on selection of a candidate beam associated with the first candidate base station, wherein the BFRQ message is transmitted through a set of physical random-access channel (PRACH) resources based on a Synchronization Signal Block (SSB) corresponding to a selected candidate beam of the first candidate base station, wherein an association between the PRACH resources and the SSB on the first candidate base station is useable by the first candidate base station to determine an identity of the selected candidate beam on which to communicate physical downlink control channel (PDCCH) and physical uplink control channel (PUCCH) signaling messages with the UE; and
      receive a beam failure recovery response (BFRR) message from the first candidate base station acknowledging the BFRQ message.

9. The apparatus of claim 8, wherein the processor is further configured to:
   in response to receiving the BFRR message:
      switch to receiving physical downlink control channel (PDCCH), physical uplink control channel (PUCCH), physical data shared channel (PDSCH) and physical uplink shared channel (PUSCH) signaling messages from the first candidate base station.

10. The apparatus of claim 9,
    wherein the switch to receiving the control channel messages is performed after a number of symbols from a time of receiving the BFRR message;
    wherein the number of symbols is dependent upon whether fine timing synchronization is required by the UE with the first candidate base station.

11. A non-transitory computer-readable memory medium storing program instructions executable by one or more processors to cause a physical serving base station (BS) to:
    obtain information about a physical cell identifier of each of one or more base stations other than the physical serving base station;
    transmit, to a user equipment (UE), the one or more physical cell identifiers, wherein the one or more physical cell identifiers form a candidate list usable by the UE to monitor a candidate reference signal from the one or more base stations during beam failure recovery; and
    transmit, to the UE, control signaling to configure PRACH resources for one or more base stations belonging to the candidate list, wherein the PRACH resources are useable by the UE to send a beam failure recovery request (BFRQ) message to at least one of the base stations in the candidate list during beam failure recovery.

12. The non-transitory computer-readable memory medium of claim 11, wherein the program instructions are further executable by the one or more processors to cause the physical serving base station (BS) to:
    transmit control signaling to the UE, wherein the control signaling is useable by the UE to determine whether a PRACH transmission from the UE to the one or more base stations in the candidate list is contention-free or contention-based.

13. The non-transitory computer-readable memory medium of claim 11, wherein the program instructions are further executable by the one or more processors to cause the physical serving base station (BS) to:
    transmit control signaling to the UE to configure an association between PRACH resources and a Synchronization Signal Block (SSB) of the one or more base stations belonging to the candidate list;
    wherein the association is useable by the UE to choose the PRACH resources to transmit the BFRQ message based on the SSB corresponding to a selected beam of a base station belonging to the candidate list.

14. The non-transitory computer-readable memory medium of claim 11, wherein the program instructions are further executable by the one or more processors to cause the physical serving base station (BS) to:
    transmit control signaling to the one or more base stations belonging to the candidate list to configure an association between PRACH resources and a Synchronization Signal Block (SSB) of the one or more base stations belonging to the candidate list;
    wherein the association is useable by the one or more bases stations in the candidate list to determine an identity of a new beam to use to communicate with the UE based on the PRACH resources on which the BFRQ message is received.

15. The non-transitory computer-readable memory medium of claim 14, wherein the identity of the new beam on which the BFRQ message is received is useable by the one or more bases stations in the candidate list to send a control resource set index 0 on the beam, wherein the BFRQ message indicates to the one or more bases stations whether the UE identified the beam for receiving the control resource set index 0 on the beam.

16. The non-transitory computer-readable memory medium of claim 14,
    wherein the identity of the new beam on which BFRR is sent is useable by the one or more bases stations in the candidate list to switch to using the new beam to communicate physical downlink control channel (PDCCH) and physical uplink control channel (PUCCH) signaling messages with the UE from the one or more base stations, after a predetermined number of symbols from a time when the BFRR is sent.

* * * * *